US012661787B2

(12) United States Patent
Wu et al.

(10) Patent No.: US 12,661,787 B2
(45) Date of Patent: Jun. 23, 2026

(54) IN-SITU ROBOT PROGRAMMING METHOD FOR HYDRAULIC TURBINE TOP COVER BASED ON BINOCULAR STRUCTURED LIGHT VISION

(71) Applicants:China Yangtze Power Co., Ltd., Wuhan (CN); Wuhan Digital Design and Manufacturing Innovation Center Co., Ltd., Wuhan (CN)

(72) Inventors: Tao Wu, Wuhan (CN); Yichuan Ran, Wuhan (CN); Ming Ma, Wuhan (CN); Zaiming Geng, Wuhan (CN); Jingnan Yan, Wuhan (CN); Jian Deng, Wuhan (CN); Hui Liu, Wuhan (CN); Cencen Yang, Wuhan (CN); Kui Huang, Wuhan (CN); Donglei Ji, Wuhan (CN); Xiaoping Zhang, Wuhan (CN); Gaipeng Zhao, Wuhan (CN)

(73) Assignees: China Yangtze Power Co., Ltd., Wuhan (CN); Wuhan Digital Design and Manufacturing Innovation Center Co., Ltd., Wuhan (CN)

( * ) Notice: Subject to any disclaimer, the term of this patent is extended or adjusted under 35 U.S.C. 154(b) by 141 days.

(21) Appl. No.: 18/892,667

(22) Filed: Sep. 23, 2024

(65) Prior Publication Data

US 2025/0121501 A1 Apr. 17, 2025

(30) Foreign Application Priority Data

Oct. 13, 2023 (CN) .......................... 202311323503.8

(51) Int. Cl.
B25J 9/16 (2006.01)
B25J 9/00 (2006.01)
(Continued)

(52) U.S. Cl.
CPC .......... B25J 9/1664 (2013.01); B25J 9/0081 (2013.01); B25J 9/1692 (2013.01); B25J 9/1697 (2013.01);
(Continued)

(58) Field of Classification Search
None
See application file for complete search history.

(56) References Cited

U.S. PATENT DOCUMENTS

2019/0338666 A1* 11/2019 Finn ...................... G06T 3/4038

* cited by examiner

*Primary Examiner* — Thomas E Worden
*Assistant Examiner* — Christopher A Buksa

(57) ABSTRACT

An in-situ robot programming method for a hydraulic turbine top cover based on binocular structured light vision is provided, which relates to the field of robot vision-guided intelligent processing technologies. The method performs hand-eye calibration on a binocular structured light camera and a robot to construct a coordinate conversion relationship thereof, collects an annular to-be-processed area of the hydraulic turbine top cover by the binocular structured light camera for joining, and obtains a trajectory and a trajectory plan through point cloud processing algorithms, to thereby achieve a rapid programming for the hydraulic turbine top cover based on guidance of binocular structured light vision. The method adapts to changes in sizes of the hydraulic turbine top cover and take into account real-time performance and robustness, so that impacts of uncertainty factors on the system are greatly weakened, and the method has characteristics of intelligence and high degree of systematization.

20 Claims, 3 Drawing Sheets

(51) Int. Cl.
　　*G06T 5/70*　　　　　(2024.01)
　　*G06T 7/80*　　　　　(2017.01)
　　*G06V 10/30*　　　　(2022.01)
　　*G06V 10/762*　　　(2022.01)

(52) U.S. Cl.
　　CPC .................. *G06T 5/70* (2024.01); *G06T 7/80*
　　　　　(2017.01); *G06V 10/30* (2022.01); *G06V*
　　　　　　*10/762* (2022.01); *G06T 2207/10028*
　　　　　　(2013.01); *G06T 2207/30241* (2013.01)

IN-SITU ROBOT PROGRAMMING METHOD FOR HYDRAULIC TURBINE TOP COVER BASED ON BINOCULAR STRUCTURED LIGHT VISION

CROSS-REFERENCE TO RELATED APPLICATION

This application claims priority to Chinese Patent Application No. 202311323503.8, filed on Oct. 13, 2023, which is herein incorporated by reference in its entirety.

TECHNICAL FIELD

The disclosure relates to the field of three-dimensional (3D) vision guided robot intelligent processing technologies, and more particularly to an in-situ robot programming method for a hydraulic turbine top cover based on binocular structured light vision.

BACKGROUND

A top cover is one of the most important flow-passing parts of a hydroelectric generating set, and is subject to cavitation erosion by water flow for a long time during an operation of the hydroelectric generating set. Many cavitation pits are formed on a flow-passing surface of the top cover due to the cavitation erosion, which poses a great safety hazard to safe operation of the hydroelectric generating set. Traditional manual repair welding and manual grinding methods are not very effective, and the top cover still faces a current situation of wide damage area, deep cavitation depth, and heavy maintenance workload. Therefore, a 3D vision technology and an intelligent robot technology are combined to complete a repair work of the top cover. Due to an annular processing surface with a width of about 14 centimeters (cm) and a circumference of about 40 meters (m) required for the top cover, and a limited image field of view collected by a 3D camera in a single collection, it is necessary to perform multiple collections to perform point cloud joining and fusion to extract a trajectory. During a service process, components and parts of the hydroelectric generating set deform due to external force factors and long-term operating wear. Therefore, a theoretical model of the components and parts cannot be directly used to represent an actual state of the components and parts when inspecting the components and parts. For a working condition where there is a lack of the theoretical model of the components and parts or the theoretical model of the components and parts cannot be directly used, it is necessary to design an in-situ robot programming method for a hydraulic turbine top cover based on binocular structured light vision to solve the above problems.

SUMMARY

A purpose of the disclosure is to provide an in-situ robot programming method for a hydraulic turbine top cover based on binocular structured light vision, the method can adapt to changes in a size of the hydraulic turbine top cover and take into account real-time performance and robustness, so that an impact of uncertainty factors on the system is greatly weakened, and the method has characteristics of intelligence and high degree of systematization.

In order to achieve the above technical effects, technical solutions adopted by the disclosure are as follows:

An in-situ robot programming method for a hydraulic turbine top cover based on binocular structured light vision, includes:

S1, performing hand-eye calibration on a binocular structured light camera and a robot;

S2, collecting three-dimensional (3D) point cloud data of a target to-be-processed area of the hydraulic turbine top cover segment by segment to obtain segments of 3D point cloud data;

S3, unifying the segments of 3D point cloud data to a coordinate system to obtain unified segments of 3D point cloud data, and joining the unified segments of 3D point cloud data to obtain joined point cloud data;

S4, processing the joined point cloud data by using point cloud processing algorithms to obtain processed point cloud data, and extracting a processing trajectory based on the processed point cloud data;

S5, performing a processing trajectory planning for the robot according to the extracted processing trajectory, to thereby generate a processing program for the robot, and performing the processing program by the robot to process the target to-be-processed area;

S6, moving the robot to a next to-be-processed area as the target to-be-processed area, and performing the steps S2-S5, to process the next to-be-processed area; and S7, repeatedly performing the step S6 until the hydraulic turbine top cover is processed.

In an embodiment, in the step S1, the performing hand-eye calibration on a binocular structured light camera and a robot, includes:

S101, fixing the binocular structured light camera on an end of the robot, and fixing a calibration board on a table; and maintaining a relative spatial position relationship between the binocular structured light camera and a flange on the end of the robot and a relative spatial position relationship between a base coordinate system of the robot and the calibration board unchanged during the hand-eye calibration;

S102, controlling the robot to move to different positions and angles relative to the calibration board to collect images of the calibration board by using the binocular structured light camera to thereby obtain 10-15 frames of images; and S103, reading pre-stored position data of the robot from a teach pendant of the robot, inputting the pre-stored position data of the robot and the 10-15 frames of images into a hand-eye calibration algorithm for the hand-eye calibration, to thereby obtain a homogeneous transformation matrix; where the homogeneous transformation matrix is configured to convert coordinate data obtained by the binocular structured light camera to coordinate data in the base coordinate system of the robot, to thereby obtain a corresponding conversion relationship between a point cloud coordinate and an actual coordinate.

In an embodiment, in the step S2, due to a limited capturing area of a 3D vision sensor (i.e., the binocular structured light camera), data needs to be collected segment by segment, and the collecting 3D point cloud data of a target to-be-processed area of the hydraulic turbine top cover segment by segment to obtain segments of 3D point cloud data, includes:

S201, hanging the hydraulic turbine top cover above the robot, and controlling the end of the robot by the teach pendant to move, to capture an annular to-be-processed area of the hydraulic turbine top cover segment by segment, to thereby obtain the segments of 3D point cloud data;

S202, calculating a conversion matrix between a base coordinate and a flange coordinate of the robot by reading data in a controller of the robot; and S203, converting each of the segments of 3D point cloud data of the hydraulic turbine top cover obtained by the 3D vision sensor to the base coordinate system of the robot according to the homogeneous transformation matrix obtained by the hand-eye calibration and the conversion matrix between the base coordinate and the flange coordinate of the robot.

In an embodiment, in the step S3, the unifying the segments of 3D point cloud data to a coordinate system to obtain unified segments of 3D point cloud data, and joining the unified segments of 3D point cloud data to obtain joined point cloud data, includes:

S301, taking a base of the robot as a base coordinate system of the robot;

S302, unifying the segments of 3D point cloud data obtained when the robot is in a target position to the base coordinate system of the robot through the conversion relationship between the point cloud coordinate and the actual coordinate; and S303, joining the unified point cloud data in the target position of the robot.

In an embodiment, in the step S4, the processing the joined point cloud data by using point cloud processing algorithms to obtain processed point cloud data, and extracting a processing trajectory based on the processed point cloud data, includes:

S401, removing noise from the joined point cloud data by using a point cloud filtering algorithm to obtain noise-removed point cloud data, and segmenting a cylindrical surface feature area from the noise-removed point cloud data by using a point cloud clustering algorithm;

S402, fitting a segment of arc on the cylindrical surface feature area by using multiple points on the cylindrical surface feature area and a least square method, to thereby obtain inner and outer circular arc segments; and S403, calculating a radial distance of the inner and outer circular arc segments, and determining a radial interval between each circular arc trajectory of the inner and outer circular arc segments according to a width of one-time processing of a cutter, and sending the radial distance and the radial interval to the controller of the robot.

In an embodiment, in the step S5, the performing a processing trajectory planning for the robot according to the extracted processing trajectory, to thereby generate a processing program for the robot, and performing the processing program by the robot, includes:

S501, sending two end points and a center point of each circular arc trajectory of the inner and outer circular arc segments to the controller of the robot;

S502, setting a motion instruction of the robot as MoveC indicating a circular arc motion instruction, and using the radial distance and the radial interval in the step S403, and the two end points and the center point in the step S501 as parameters of the motion instruction;

S503, starting the robot to process the hydraulic turbine top cover according to the motion instruction of the robot, to thereby complete a processing of the corresponding circular arc trajectory of the hydraulic turbine top cover; and S504, preforming the steps S501-S503 until the robot has processed the target to-be-processed area.

In an embodiment, the step S6 specifically includes:

S601, pushing a vehicle carrying the robot to the next to-be-processed area through manpower;

S602, performing the steps S2-S5 to extract the processing trajectory of the robot, generate the processing program for the robot, and performing the processing program by the robot; and S603, repeatedly performing steps S601-602 until an annular to-be-processed area of the hydraulic turbine top cover is processed.

In an embodiment, the robot is a six-axis robot.

Advantages of the in-situ robot programming method for the hydraulic turbine top cover based on binocular structured light vision provided by the disclosure are as follows.

1. The advantages of the in-situ robot programming method for the hydraulic turbine top cover based on binocular structured light vision proposed by the disclosure are that it maximizes efficiency of processing for the processing of large hydraulic turbine top covers, generates multiple processing trajectories at the same time, reduces manual participation, and combines vision algorithms and a robot control theory to complete high-efficiency and high-precision intelligent processing.

2. The disclosure combines a binocular vision technology and a traditional robot technology, integrates advanced point cloud processing algorithms into the binocular camera-robot guidance control system, and transmits the workpiece status to the robot in real time through multi-coordinate transfer, so that the robot has a certain level of environmental perception ability and the ability to respond to random changes in the status of workpieces in complex environments in real time, so as to improve the speed and accuracy of vision-guided robot movement. The visual guidance method proposed by the disclosure can adapt to changes in the size of the hydraulic turbine top cover, and has the advantage of guiding the robot to quickly program by generating multiple processing trajectories at one time.

LIST OF REFERENCE NUMBERS

Figure 2:
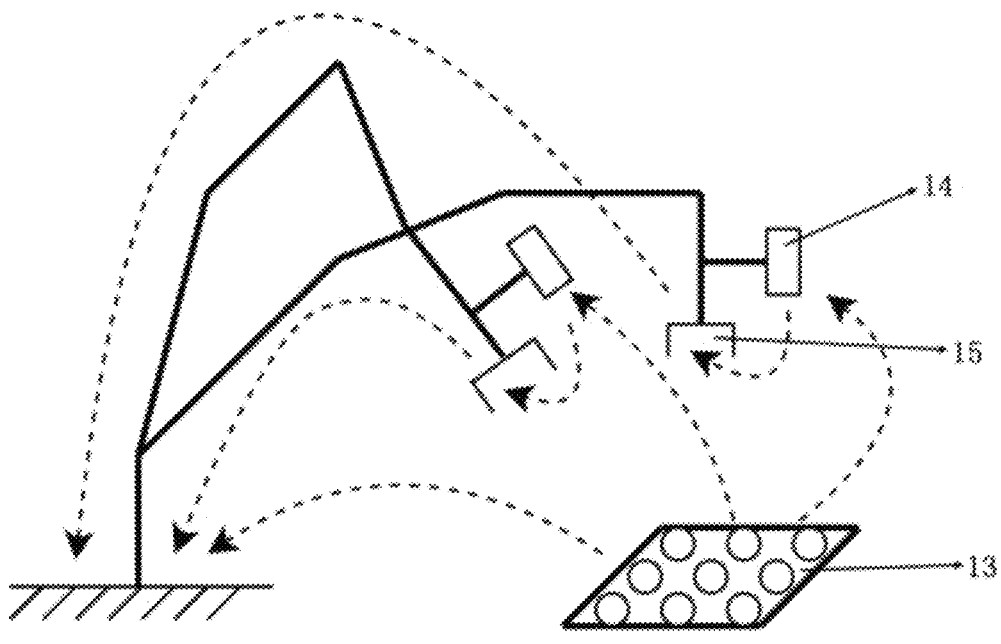
FIG. 2 illustrates a schematic diagram of a position relationship among a binocular structured light camera, a robot and a calibration board according to an embodiment of the disclosure.

1—hydraulic turbine top cover; 2—annular to-be-processed area; 3—robot; 3.1—vehicle; 4—robot tool and binocular structured light camera; 5—first stop position of robot; 6—second stop position of robot; 7—first collection area of robot; 8—second collection area of robot; 9—third collection area of robot; 10—Link of robot; 11—movement route of robot; 12—circular arc processing trajectory generated by robot; 13—calibration board; 14—binocular structured light camera; 15—flange on end of robot;

specifically, dashed lines in FIG. 2 represent movement trajectories of the binocular structured light camera, the robot and the calibration board.

DETAILED DESCRIPTION OF EMBODIMENTS

Figure 1:
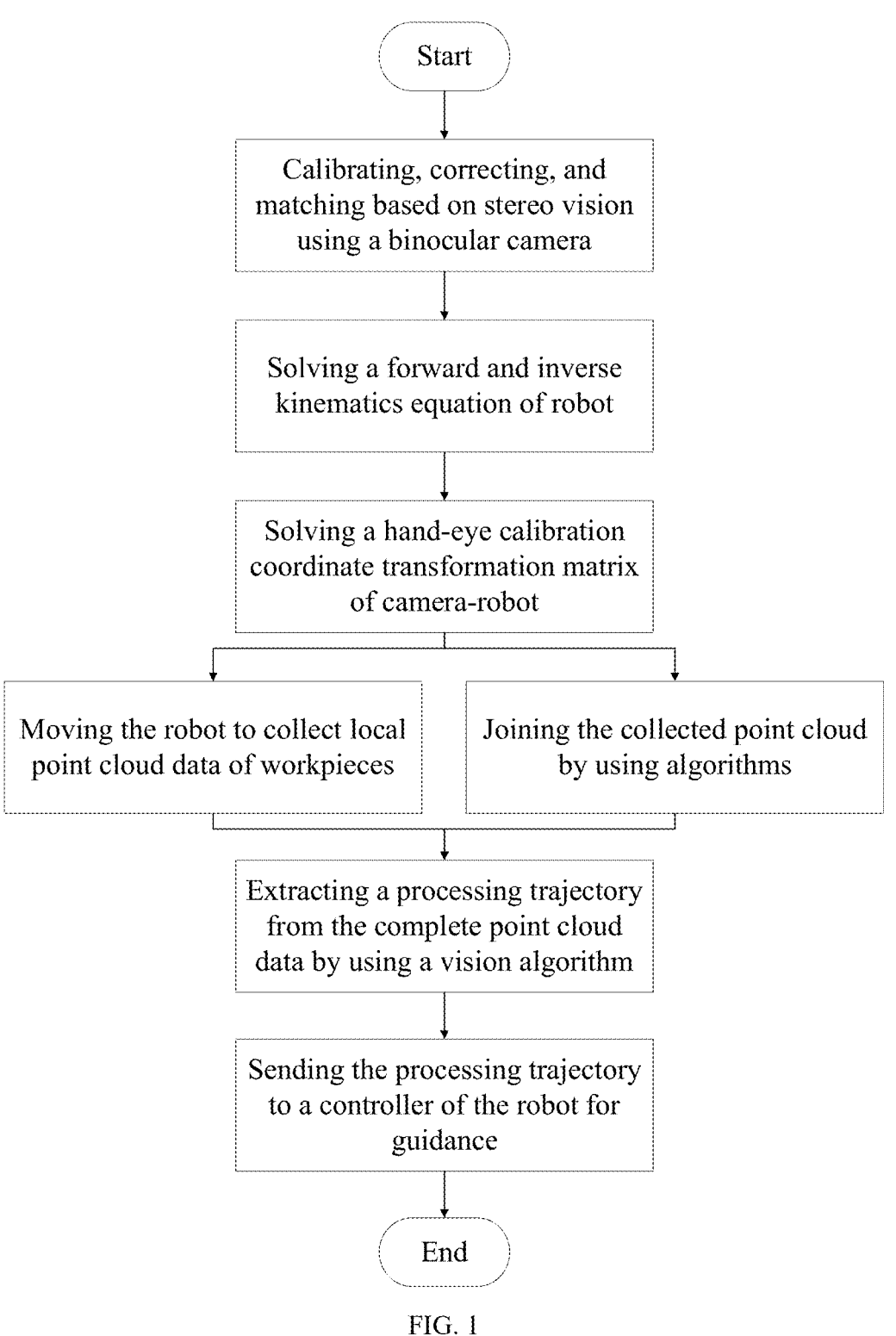
FIG. 1 illustrates a flowchart of an in-situ robot programming method for a hydraulic turbine top cover based on binocular structured light vision according to an embodiment of the disclosure.

As shown in FIG. 1, an in-situ robot programming method for a hydraulic turbine top cover based on binocular structured light vision includes the following steps S1-S7.

In step S1, hand-eye calibration is performed on a binocular structured light camera 14 and a robot 3.

In step S2, 3D point cloud data of a target to-be-processed area of the hydraulic turbine top cover 1 is collected segment by segment to obtain segments of 3D point cloud data.

In step S3, the segments of 3D point cloud data is unified to a coordinate system to obtain unified segments of 3D point cloud data, and the unified segments of 3D point cloud data is joined to obtain joined point cloud data.

In step S4, the joined point cloud data is processed by using point cloud processing algorithms to obtain processed point cloud data, and a processing trajectory is extracted based on the processed point cloud data.

In step S5, a processing trajectory planning for the robot is performed according to the extracted processing trajectory, to thereby generate a processing program for the robot, and the processing program is performed by the robot.

In step S6, robot is moved to a next to-be-processed area as the target to-be-processed area, and the steps S2-S5 are performed to process the next to-be-processed area.

In step S7, the step S6 is repeatedly performed until the hydraulic turbine top cover 1 is processed.

Specifically, a relationship formula between a coordinate $(X_w, Y_w, Z_w)$ of a point p in a world coordinate system (i.e., a base coordinate system of the robot) and a coordinate (u, v) of an image projection point $p_1$ of the point p is expressed as follows:

$$s \begin{bmatrix} u \\ v \\ 1 \end{bmatrix} = \begin{bmatrix} \dfrac{f}{dX} & 0 & u_0 & 0 \\ 0 & \dfrac{f}{dY} & v_0 & 0 \\ 0 & 0 & 1 & 0 \end{bmatrix} \begin{bmatrix} R_1 & T_1 \\ 0^T & 1 \end{bmatrix} \begin{bmatrix} X_w \\ Y_w \\ Z_w \\ 1 \end{bmatrix} = M_1 \begin{bmatrix} X_w \\ Y_w \\ Z_w \\ 1 \end{bmatrix};$$

where s represents a ratio factor, dX represents a physical size corresponding to an X-axis of the world coordinate system, dY represents a physical size corresponding to a Y-axis of the world coordinate system, $(u_0, v_0)$ represents a coordinate of a center point of an image collected by the binocular structured light camera 14, f represents a focal length of the binocular structured light camera 14, $R_1$ represents a rotation matrix for converting a camera coordinate system to the world coordinate system, $T_1$ represents a translation vector for converting the camera coordinate system to the world coordinate system, and $M_1$ represents a conversion matrix between a coordinate of the camera coordinate system and a coordinate of the world coordinate system.

In an embodiment, as shown in FIG. 2, the step S1 specifically includes the following steps S101-S103.

In step S101, the binocular structured light camera 14 is fixed on an end of the robot 3, and a calibration board 13 is fixed on a table. A relative spatial position relationship between the binocular structured light camera 14 and a flange 15 on the end of the robot and a relative spatial position relationship between a base coordinate system of the robot 3 and the calibration board 13 are maintained unchanged during the hand-eye calibration.

In step S102, the robot 3 is controlled to move to different positions and angles relative to the calibration board 13 to collect images of the calibration board 13 by using the binocular structured light camera 14 to thereby obtain 10-15 frames of images.

In step S103, pre-stored position data of the robot is read from a teach pendant of the robot 3, the pre-stored position data of the robot 3 and the 10-15 frames of images are input in to a hand-eye calibration algorithm for the hand-eye calibration, to thereby obtain a homogeneous transformation matrix. The homogeneous transformation matrix is configured to convert coordinate data obtained by the binocular structured light camera 14 to coordinate data in the base coordinate system of the robot 3, to thereby obtain a corresponding relationship between a point cloud coordinate and an actual coordinate.

Specifically, the hand-eye calibration algorithm may be a Tsai-Lenz algorithm, a Navy algorithm, a Horaud algorithm, a dual quaternions algorithm, or a Daniilidis algorithm. The specific hand-eye calibration algorithm can be selected according to actual needs, and is not limited here.

Figure 3:
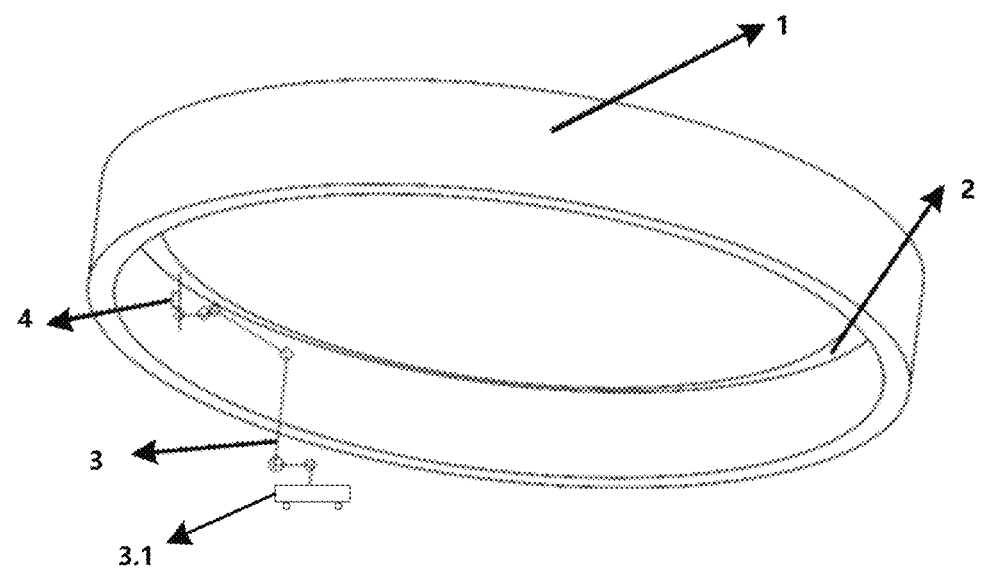
FIG. 3 illustrates a schematic diagram of an actual application scenario of the in-situ robot programming method for the hydraulic turbine top cover based on binocular structured light vision according to an embodiment of the disclosure.
Figure 4:
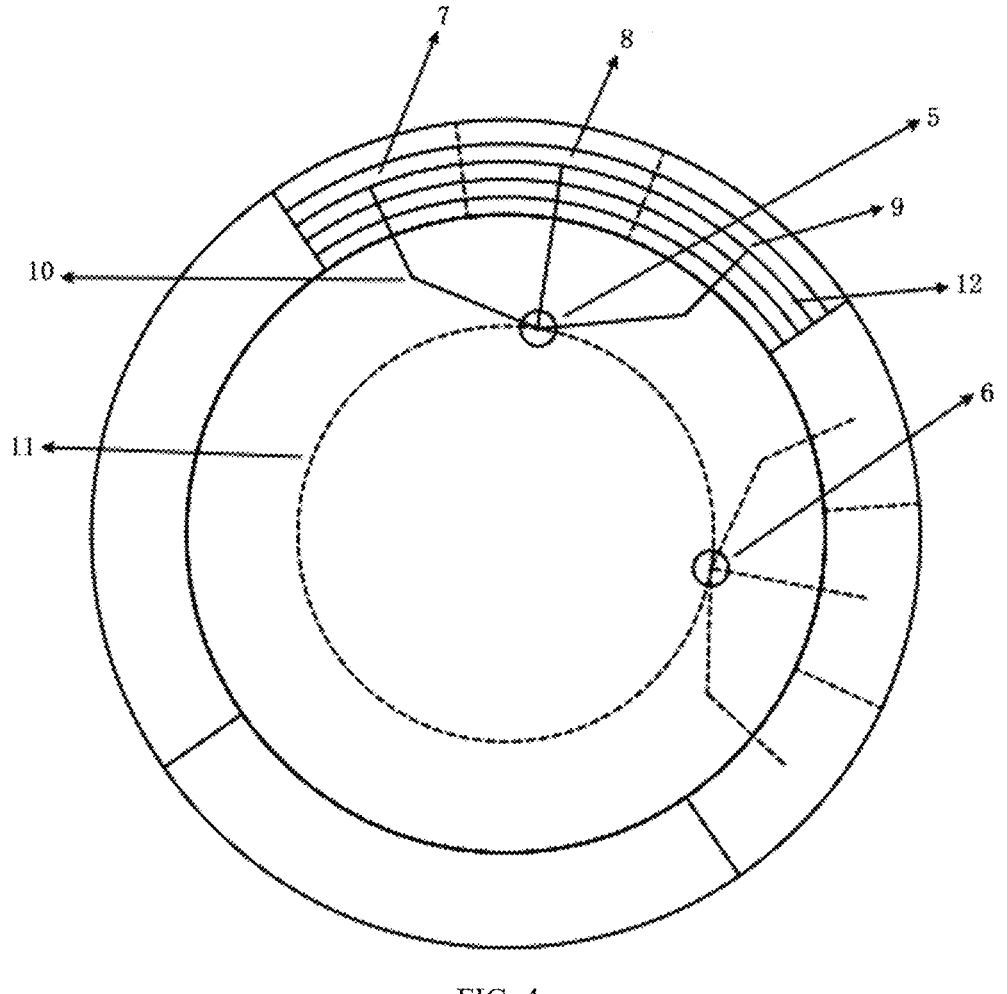
FIG. 4 illustrates a schematic diagram of an implementation in the actual application scenario of the in-situ robot programming method for the hydraulic turbine top cover based on binocular structured light vision according to an embodiment of the disclosure.

In an embodiment, as shown in FIG. 3 and FIG. 4, due to a limited capturing area of a 3D vision sensor, the data needs to be collected segment by segment. Therefore, the step S1 specifically includes the following steps S201-S203.

In step S201, the hydraulic turbine top cover 1 is hung above the robot 3, and the end of the robot 3 is controlled by the teach pendant to move, to capture an annular to-be-processed area 2 of the hydraulic turbine top cover 1 segment by segment, to thereby obtain the segments of 3D point cloud data.

In step S202, a conversion matrix between a base coordinate and a flange coordinate of the robot 3 is calculated by reading data in a controller of the robot 3.

In step S203, each of the segments of 3D point cloud data of the hydraulic turbine top cover 1 obtained by the 3D vision sensor is converted to the base coordinate system of the robot 3 according to the homogeneous transformation matrix obtained by the hand-eye calibration and the conversion matrix between the base coordinate and the flange coordinate of the robot 3.

In an embodiment, as shown in FIG. 4, the steps S3 specifically includes the following steps S301-S303.

In step S301, a base of the robot 3 is taken as a base coordinate system.

In step S302, the segments of 3D point cloud data obtained when the robot 3 is in a target position is unified to the base coordinate system of the robot 3 through the conversion relationship between the point cloud coordinate and the actual coordinate.

In step S303, the unified segments of 3D point cloud data in the target position of the robot 3 is joined.

In an embodiment, as shown in FIG. 4, the step S4 specifically includes the following steps S401-S403.

In step S401, noise is removed from the joined point cloud data by using a point cloud filtering algorithm to obtain noise-removed point cloud data, and a cylindrical surface feature area is segmented from the noise-removed point cloud data by using a point cloud clustering algorithm.

In step S402, a segment of arc is fitted on the cylindrical surface feature area by using multiple points on the cylindrical surface feature area and a least square method, to thereby obtain inner and outer circular arc segments.

In step S403, a radial distance of the inner and outer circular arc segments is calculated, a radial interval between each circular arc trajectory of the inner and outer circular arc segments is determined according to a width of one-time processing of a cutter, and the radial distance and the radial interval are sent to the controller of the robot 3.

In an embodiment, as shown in FIG. 4, the step S5 specifically includes the following steps S501-S504.

In step S501, two end points and a center point of each circular arc trajectory of the inner and outer circular arc segments are sent to the controller of the robot 3.

In step 502, a motion instruction of the robot 3 is set as MoveC indicating a circular arc motion instruction, and the radial distance and the radial interval in the step S403, and the two end points and the center point in the step S501 are used as parameters of the motion instruction.

In step S503, the robot 3 is started to process the hydraulic turbine top cover 1 according to the motion instruction of the robot, to thereby complete a processing of the corresponding circular arc trajectory of the hydraulic turbine top cover 1.

In step S504, the steps S501-S503 are performed until the robot has processed the target to-be-processed area.

In an embodiment, as shown in FIG. 4, the step S6 specifically includes the following steps S601-S603.

In step S601, a vehicle 3.1 carrying the robot 3 is pushed to the next to-be-processed area through manpower.

In step S602, the steps S2-S5 are performed to extract the processing trajectory of the robot 3, generate the processing program for the robot 3, and the processing program is performed by the robot 3.

In step S603, steps S601-602 are repeatedly performed until the annular to-be-processed area 2 of the hydraulic turbine top cover 1 is processed.

The above-mentioned embodiments are merely some of technical solutions of the disclosure, and should not be regarded as limitations of the disclosure. The embodiments and features in the embodiments in the disclosure can be arbitrarily combined with each other as long as there is no conflict. A scope of protection of the disclosure shall be the technical solutions recorded in claims, including equivalent replacement solutions of the technical features in the technical solutions recorded in the claims. That is, equivalent substitutions and improvements within this scope are also within the scope of protection of the disclosure.

What is claimed is:

1. An in-situ robot programming method for a hydraulic turbine top cover based on binocular structured light vision, the in-situ robot programming method comprising:

S1, performing hand-eye calibration on a binocular structured light camera and a robot;

S2, collecting three-dimensional (3D) point cloud data of a target to-be-processed area of the hydraulic turbine top cover segment by segment to obtain segments of 3D point cloud data;

S3, unifying the segments of 3D point cloud data to a coordinate system to obtain unified segments of 3D point cloud data, and joining the unified segments of 3D point cloud data to obtain joined point cloud data;

S4, processing the joined point cloud data by using point cloud processing algorithms to obtain processed point cloud data, and extracting a processing trajectory based on the processed point cloud data;

S5, performing a processing trajectory planning for the robot according to the extracted processing trajectory, to thereby generate a processing program for the robot, and performing the processing program by the robot to process the target to-be-processed area;

S6, moving the robot to a next to-be-processed area as the target to-be-processed area, and performing the steps S2-S5, to process the next to-be-processed area; and S7, repeatedly performing the step S6 until the hydraulic turbine top cover is processed.

2. The in-situ robot programming method for the hydraulic turbine top cover based on binocular structured light vision as claimed in claim 1, wherein in the step S1, the performing hand-eye calibration on a binocular structured light camera and a robot, comprises:

S101, fixing the binocular structured light camera on an end of the robot, and fixing a calibration board; and maintaining a relative spatial position relationship between the binocular structured light camera and a flange on the end of the robot and a relative spatial position relationship between a base coordinate system of the robot and the calibration board unchanged during the hand-eye calibration;

S102, controlling the robot to move to different positions and angles relative to the calibration board to collect images of the calibration board by using the binocular structured light camera to thereby obtain 10-15 frames of images; and S103, reading pre-stored position data of the robot from a teach pendant of the robot, inputting the pre-stored position data of the robot and the 10-15 frames of images into a hand-eye calibration algorithm for the hand-eye calibration to thereby obtain a homogeneous transformation matrix; wherein the homogeneous transformation matrix is configured to convert coordinate data obtained by the binocular structured light camera to coordinate data in the base coordinate system of the robot, to thereby obtain a conversion relationship between a point cloud coordinate and an actual coordinate.

3. The in-situ robot programming method for the hydraulic turbine top cover based on binocular structured light vision as claimed in claim 2, wherein in the step S2, the collecting 3D point cloud data of a target to-be-processed area of the hydraulic turbine top cover segment by segment to obtain segments of 3D point cloud data, comprises:

S201, hanging the hydraulic turbine top cover above the robot, and controlling the end of the robot by the teach pendant to move, to capture an annular to-be-processed area of the hydraulic turbine top cover segment by segment, to thereby obtain the segments of 3D point cloud data;

S202, calculating a conversion matrix between a base coordinate and a flange coordinate of the robot by reading data in a controller of the robot; and S203, converting each of the segments of 3D point cloud data of the hydraulic turbine top cover obtained by the binocular structured light camera to the base coordinate system of the robot according to the homogeneous transformation matrix obtained by the hand-eye calibration and the conversion matrix between the base coordinate and the flange coordinate of the robot.

4. The in-situ robot programming method for the hydraulic turbine top cover based on binocular structured light vision as claimed in claim 3, wherein in the step S3, the unifying the segments of 3D point cloud data into a coordinate system to obtain unified segments of 3D point cloud data, and joining the unified segments of 3D point cloud data to obtain joined point cloud data, comprises:

S301, taking a base of the robot as a base coordinate system of the robot;

S302, unifying the segments of 3D point cloud data obtained when the robot is in a target position to the base coordinate system of the robot through the conversion relationship between the point cloud coordinate and the actual coordinate; and S303, joining the unified segments of 3D point cloud data in the target position of the robot.

5. The in-situ robot programming method for the hydraulic turbine top cover based on binocular structured light vision as claimed in claim 1, wherein in the step S4, the processing the joined point cloud data by using point cloud processing algorithms to obtain processed point cloud data, and extracting a processing trajectory based on the processed point cloud data, comprises:

S401, removing noise from the joined point cloud data by using a point cloud filtering algorithm to obtain noise-removed point cloud data, and segmenting a cylindrical surface feature area from the noise-removed point cloud data by using a point cloud clustering algorithm;

S402, fitting a segment of arc on the cylindrical surface feature area by using multiple points on the cylindrical surface feature area and a least square method, to thereby obtain inner and outer circular arc segments; and S403, calculating a radial distance of the inner and outer circular arc segments, determining a radial interval between each circular arc trajectory of the inner and outer circular arc segments according to a width of one-time processing of a cutter, and sending the radial distance and the radial interval to a controller of the robot.

6. The in-situ robot programming method for the hydraulic turbine top cover based on binocular structured light vision as claimed in claim 5, wherein in the step S5, the performing a processing trajectory planning for the robot according to the extracted processing trajectory, to thereby generate a processing program for the robot, and performing the processing program by the robot, comprises:

S501, sending two end points and a center point of each circular arc trajectory of the inner and outer circular arc segments to the controller of the robot;

S502, setting a motion instruction of the robot as MoveC indicating a circular arc motion instruction, and using the radial distance and the radial interval in the step S403, and the two end points and the center point in the step S501 as parameters of the motion instruction;

S503, starting the robot to process the hydraulic turbine top cover according to the motion instruction of the robot, to thereby complete a processing of the corresponding circular arc trajectory of the hydraulic turbine top cover; and S504, preforming the steps S501-S503 until the robot has processed the target to-be-processed area.

7. The in-situ robot programming method for the hydraulic turbine top cover based on binocular structured light vision as claimed in claim 6, wherein the step S6 specifically comprises:

S601, pushing a vehicle carrying the robot to the next to-be-processed area through manpower;

S602, performing the steps S2-S5 to extract the processing trajectory of the robot, generate the processing program for the robot, and performing the processing program by the robot; and S603, repeatedly performing the steps S601-602 until an annular to-be-processed area of the hydraulic turbine top cover is processed.

8. The in-situ robot programming method for the hydraulic turbine top cover based on binocular structured light vision as claimed in claim 1, wherein the robot is a six-axis robot.

9. An in-situ robot programming method for a hydraulic turbine top cover based on binocular structured light vision, comprising:

S1, performing hand-eye calibration on a binocular structured light camera and a robot to obtain a homogeneous transformation matrix;

S2, collecting, by the binocular structured light camera, 3D point cloud data of a target to-be-processed area of the hydraulic turbine top cover segment by segment to obtain segments of 3D point cloud data;

S3, unifying the segments of 3D point cloud data to a coordinate system to obtain unified segments of 3D point cloud data, and joining the unified segments of 3D point cloud data to obtain joined point cloud data;

S4, processing the joined point cloud data by using point cloud processing algorithms to obtain processed point cloud data, and extracting a processing trajectory based on the processed point cloud data; wherein the point cloud processing algorithms comprise: a point cloud filtering algorithm and a point cloud clustering algorithm;

S5, performing a processing trajectory planning for the robot according to the extracted processing trajectory, to thereby generate a processing program for the robot, and performing the processing program by the robot; and S6, moving the robot to a next to-be-processed area as the target to-be-processed area, and performing the steps S2-S5, to process the next to-be-processed area;

S7, repeatedly performing the step S6 until the hydraulic turbine top cover is processed.

10. The in-situ robot programming method for the hydraulic turbine top cover based on binocular structured light vision as claimed in claim 9, wherein the step S1 specifically comprises:

S101, fixing the binocular structured light camera on an end of the robot, and fixing the calibration board; and maintaining a relative spatial position relationship between the binocular structured light camera and a flange on the end of the robot and a relative spatial position relationship between a base coordinate system of the robot and the calibration board unchanged during the hand-eye calibration;

S102, controlling the robot to move to different positions and angles relative to the calibration board to collect images of the calibration board by using the binocular structured light camera to thereby obtain 10-15 frames of images; and S103, reading pre-stored position data of the robot from a teach pendant of the robot, inputting the pre-stored position data of the robot and the 10-15 frames of images into a hand-eye calibration algorithm for the hand-eye calibration, to thereby obtain the homogeneous transformation matrix.

11. The in-situ robot programming method for the hydraulic turbine top cover based on binocular structured light vision as claimed in claim 10, wherein the step S2 specifically comprises:

S201, hanging the hydraulic turbine top cover above the robot, and controlling the end of the robot by the teach pendant to move, to capture an annular to-be-processed area of the hydraulic turbine top cover segment by segment, to thereby obtain the segments of 3D point cloud data;

S202, calculating a conversion matrix between a base coordinate and a flange coordinate of the robot by reading data in a controller of the robot; and S203, converting each of the segments of 3D point cloud data of the hydraulic turbine top cover obtained by the binocular structured light camera to the base coordinate system of the robot according to the homogeneous transformation matrix obtained by the hand-eye calibration and the conversion matrix between the base coordinate and the flange coordinate of the robot.

12. The in-situ robot programming method for the hydraulic turbine top cover based on binocular structured light vision as claimed in claim 9, wherein the step S3 specifically comprises:

S301, taking a base of the robot as a base coordinate system of the robot;

S302, unifying the segments of 3D point cloud data obtained when the robot is in a target position to the base coordinate system of the robot through a conversion relationship between a point cloud coordinate and an actual coordinate; and S303, joining the unified segments of 3D point cloud data in the target position of the robot.

13. The in-situ robot programming method for the hydraulic turbine top cover based on binocular structured light vision as claimed in claim 9, wherein the step S4 specifically comprises:

S401, removing noise from the joined point cloud data by using the point cloud filtering algorithm to obtain noise-removed point cloud data, and segmenting a cylindrical surface feature area from the noise-removed point cloud data by using the point cloud clustering algorithm;

S402, fitting a segment of arc on the cylindrical surface feature area by using multiple points on the cylindrical surface feature area and a least square method, to thereby obtain inner and outer circular arc segments; and S403, calculating a radial distance of the inner and outer circular arc segments, determining a radial interval between each circular arc trajectory of the inner and outer circular arc segments according to a width of one-time processing of a cutter, and sending the radial distance and the radial interval to a controller of the robot.

14. The in-situ robot programming method for the hydraulic turbine top cover based on binocular structured light vision as claimed in claim 13, wherein the step S5 specifically comprises:

S501, sending two end points and a center point of each circular arc trajectory of the inner and outer circular arc segments to the controller of the robot;

S502, setting a motion instruction of the robot as MoveC indicating a circular arc motion instruction, and using the radial distance and the radial interval in the step S403, and the two end points and the center point in the step S501 as parameters of the motion instruction;

S503, starting the robot to process the hydraulic turbine top cover according to the motion instruction of the robot, to thereby complete a processing of the corresponding circular arc trajectory of the hydraulic turbine top cover; and S504, preforming the steps S501-S503 until the robot has processed the target to-be-processed area.

15. The in-situ robot programming method for the hydraulic turbine top cover based on binocular structured light vision as claimed in claim 14, wherein the step S6 specifically comprises:

S601, pushing a vehicle carrying the robot to the next to-be-processed area through manpower;

S602, performing the steps S2-S5 to extract the processing trajectory of the robot, generate the processing program for the robot, and performing the processing program by the robot; and S603, repeatedly performing steps S601-602 until the annular to-be-processed area of the hydraulic turbine top cover is processed.

16. An in-situ robot programming method for a hydraulic turbine top cover based on binocular structured light vision, comprising:

S1, performing hand-eye calibration on a binocular structured light camera and a robot;

S2, collecting 3D point cloud data of a target to-be-processed area of the hydraulic turbine top cover segment by segment to obtain segments of 3D point cloud data; wherein the collecting 3D point cloud data of a target to-be-processed area of the hydraulic turbine top cover segment by segment to obtain segments of 3D point cloud data, comprises:

S201, hanging the hydraulic turbine top cover above the robot, and controlling an end of the robot by a teach pendant to move, to capture an annular to-be-processed area of the hydraulic turbine top cover segment by segment, to thereby obtain the segments of 3D point cloud data;

S202, calculating a conversion matrix between a base coordinate and a flange coordinate of the robot by reading data in a controller of the robot; and S203, converting each of the segments of 3D point cloud data of the hydraulic turbine top cover obtained by the binocular structured light camera to a base coordinate system of the robot according to a homogeneous transformation matrix obtained by the hand-eye calibration and the conversion matrix between the base coordinate and the flange coordinate of the robot;

S3, unifying the segments of 3D point cloud data to a coordinate system to obtain unified segments of 3D point cloud data, and joining the unified segments of 3D point cloud data to obtain joined point cloud data;

S4, processing the joined point cloud data by using point cloud processing algorithms to obtain processed point cloud data, and extracting a processing trajectory based on the processed point cloud data;

S5, performing a processing trajectory planning for the robot according to the extracted processing trajectory, to thereby generate a processing program for the robot, and performing the processing program by the robot;

S6, moving the robot to a next to-be-processed area as the target to-be-processed area, and performing the steps S2-S5, to process the next to-be-processed area; and S7, repeatedly performing the step S6 until the hydraulic turbine top cover is processed.

17. The in-situ robot programming method for the hydraulic turbine top cover based on binocular structured light vision as claimed in claim 16, wherein the step S3 specifically comprises:

S301, taking a base of the robot as the base coordinate system of the robot;

S302, unifying the segments of 3D point cloud data obtained when the robot is in a target position to the base coordinate system of the robot through a conversion relationship between a point cloud coordinate and an actual coordinate; and S303, joining the unified segments of 3D point cloud data in the target position of the robot.

18. The in-situ robot programming method for the hydraulic turbine top cover based on binocular structured light vision as claimed in claim 16, wherein the step S4 specifically comprises:

S401, removing noise from the joined point cloud data by using a point cloud filtering algorithm to obtain noise-removed point cloud data, and segmenting a cylindrical surface feature area from the noise-removed point cloud data by using a point cloud clustering algorithm;

S402, fitting a segment of arc on the cylindrical surface feature area by using multiple points on the cylindrical surface feature area and a least square method, to thereby obtain inner and outer circular arc segments; and S403, calculating a radial distance of the inner and outer circular arc segments, determining a radial interval between each circular arc trajectory of the inner and outer circular arc segments according to a width of one-time processing of a cutter, and sending the radial distance and the radial interval to a controller of the robot.

19. The in-situ robot programming method for the hydraulic turbine top cover based on binocular structured light vision as claimed in claim 18, wherein the step S5 specifically comprises:

S501, sending two end points and a center point of each circular arc trajectory of the inner and outer circular arc segments to the controller of the robot;

S502, setting a motion instruction of the in-situ robot as MoveC indicating a circular arc motion instruction, and using the radial distance and the radial interval in the step S403, and the two end points and the center point in the step S501 as parameters of the motion instruction;

S503, starting the robot to process the hydraulic turbine top cover according to the motion instruction of the robot, to thereby complete a processing of a corresponding circular arc trajectory of the hydraulic turbine top cover; and S504, preforming the steps S501-S503 until the robot has processed the target to-be-processed area.

20. The in-situ robot programming method for the hydraulic turbine top cover based on binocular structured light vision as claimed in claim 19, wherein the step S6 specifically comprises:

S601, pushing a vehicle carrying the robot to the next to-be-processed area through manpower;

S602, performing the steps S2-S5 to extract the processing trajectory of the robot, generate the processing program for the robot, and performing the processing program by the robot; and S603, repeatedly performing steps S601-602 until the annular to-be-processed area of the hydraulic turbine top cover is processed.

* * * * *